Figure 1:
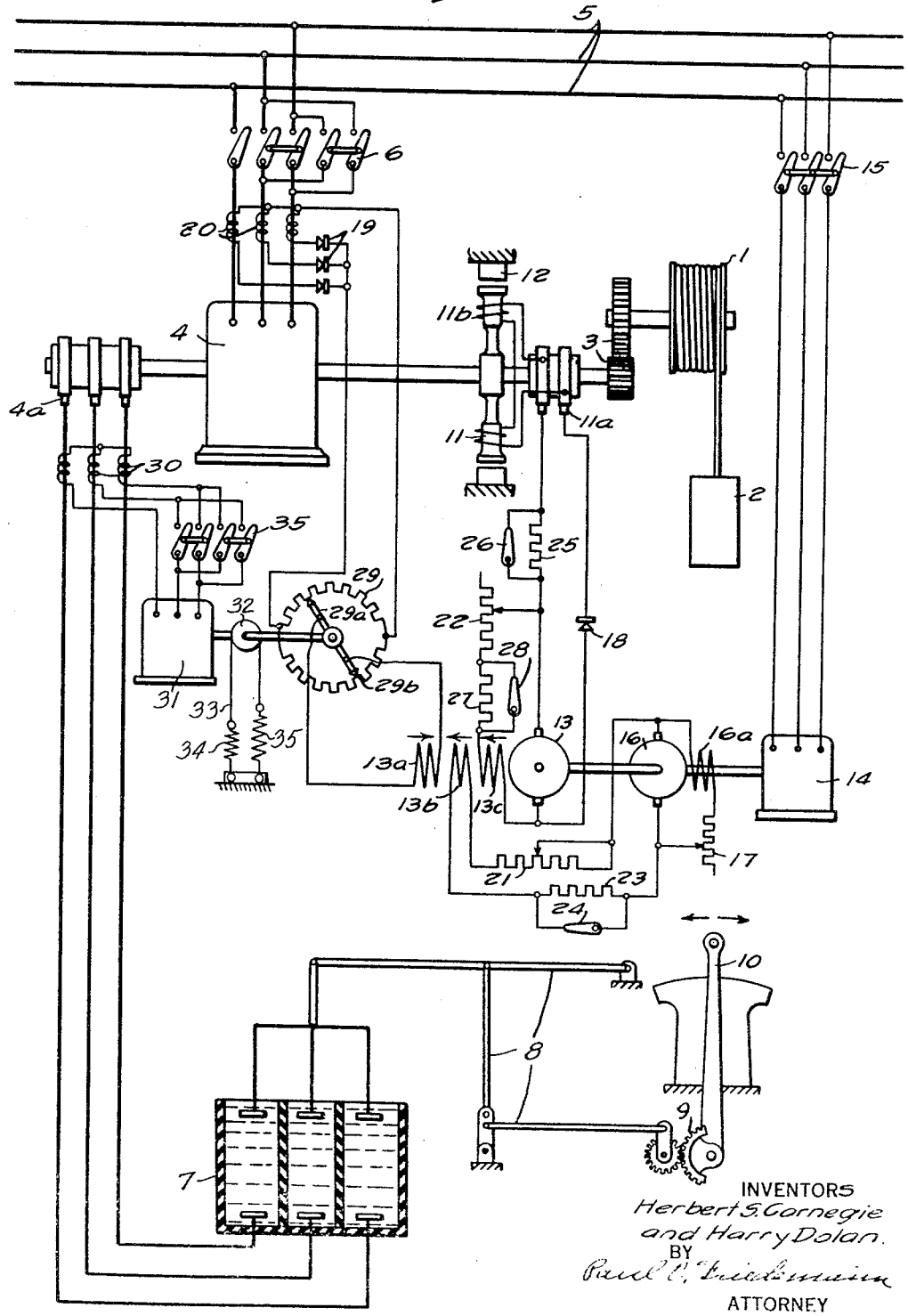

March 16, 1948.  H. S. CARNEGIE ET AL  2,437,996
INDUCTION MOTOR CONTROL BY ELECTRIC BRAKE
Filed Dec. 15, 1945  2 Sheets-Sheet 1

INVENTORS
Herbert S. Carnegie
and Harry Dolan.
BY
Paul C. Friedman
ATTORNEY

March 16, 1948.  H. S. CARNEGIE ET AL  2,437,996

INDUCTION MOTOR CONTROL BY ELECTRIC BRAKE

Filed Dec. 15, 1945    2 Sheets-Sheet 2

INVENTORS
Herbert S. Carnegie
and Harry Dolan.
BY
Paul E. Friedemann
ATTORNEY

Patented Mar. 16, 1948

2,437,996

UNITED STATES PATENT OFFICE 2,437,996

INDUCTION MOTOR CONTROL BY ELECTRIC BRAKE

Herbert Stirling Carnegie and Harry Dolan, Stafford, England, assignors to The English Electric Company Limited, London, England, a British company Application December 15, 1945, Serial No. 635,352
In Great Britain January 29, 1945

10 Claims. (Cl. 318—302)

Our invention relates to means for controlling the speed of electric motors and, more specifically, to control systems which are provided with an electromagnetically operating brake, such as an eddy current brake, as one of the speed controlling devices.

It is an object of the invention to provide a control system, especially suited for alternating-current motors of the slip-ring induction type, which operates automatically to control an electromagnetic brake in dependence upon the selected speed setting chosen by the operator, and which performs such an automatic speed control without the aid of contactors or the like switching equipment.

To this end, and in accordance with the invention, we design a motor control system in such a manner that if the speed of an electric motor differs from, or, more particularly, if it appreciably exceeds a speed corresponding to the position of a speed regulator—at least during retardation of the motor—an eddy current brake, mechanically coupled to the motor, is automatically excited, thereby tending to restore the speed to the correct value.

In one form of the invention, the eddy current brake is excited in response to the current taken by the primary winding of a slip-ring induction motor in such a fashion that the excitation is increased automatically in response to the primary current falling below a certain value so that the tendency is to maintain the current drawn from the supply at that value; the motor speed regulator varies the resistance in the secondary circuit and so long as the primary current is maintained at a certain value, the motor speed will be determined by the rotor resistance.

In another form of the invention—preferably for the control of hoisting equipment such as mine winding gears—the eddy current brake is excited by means automatically acted on differentially by the speed regulator and by means responsive to the motor speed in such fashion that if the motor speed appreciably exceeds a determined value the eddy current brake is excited.

These and more specific objects and features of the invention will be apparent from the embodiments shown in the drawings and described hereinafter.

Figure 2:
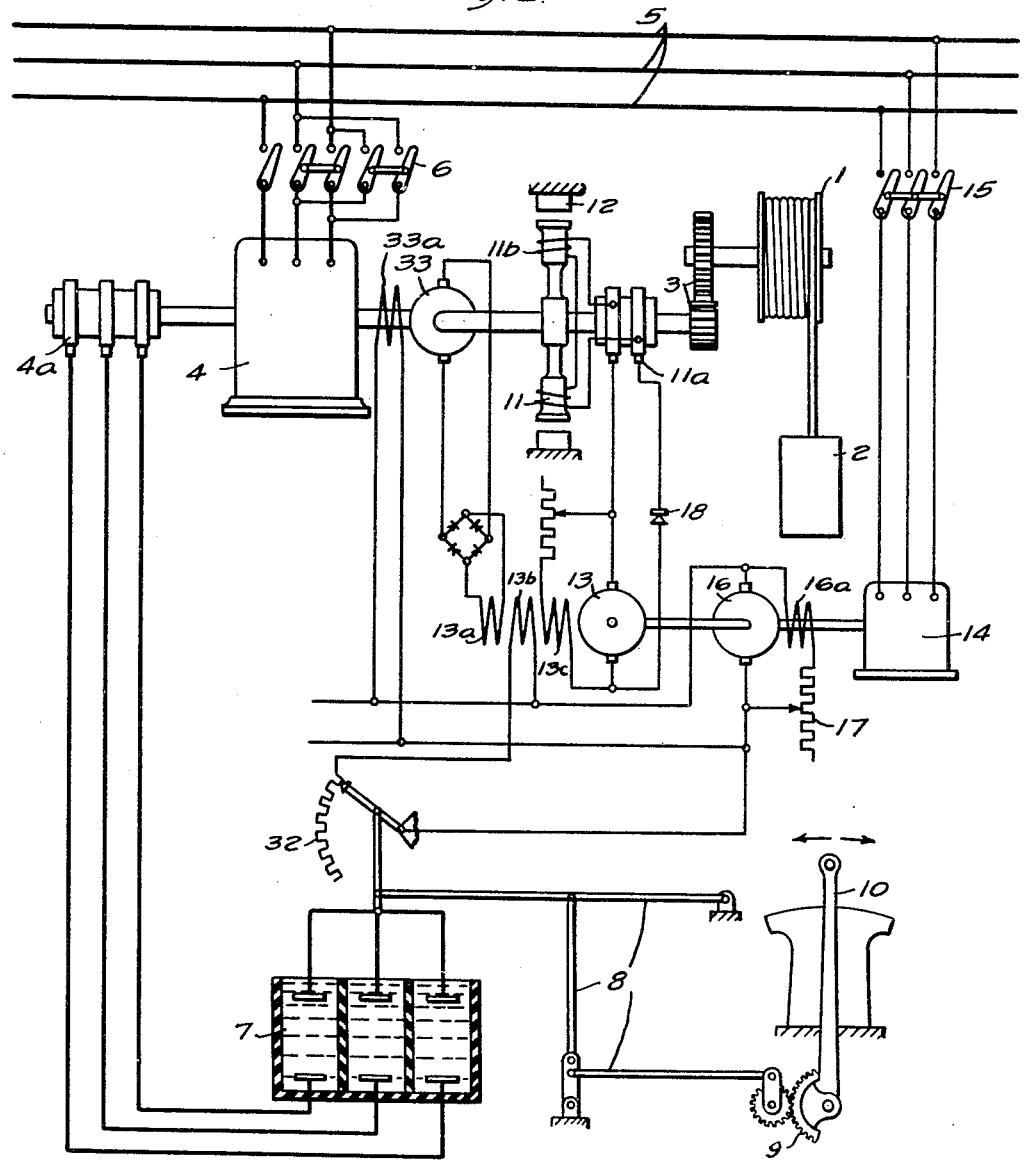
Figure 3:
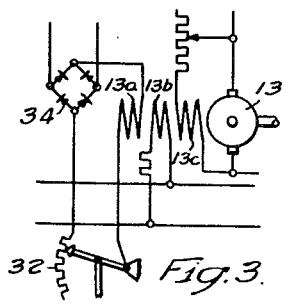
Figure 4:
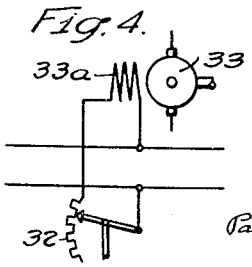

In the drawing, Figure 1 illustrates diagrammatically a control system according to our invention applicable for mine winding gears, cranes, and other hoisting equipment; Fig. 2 is the diagram of another embodiment of the invention also with reference to a hoist control system; and Figs. 3 and 4 represent two different modifications of part of a control system otherwise designed as shown in Fig. 2.

In Figures 1 and 2, the winding drum 1 for hoisting and lowering a load 2 is driven through gearing 3 by a three-phase alternating-current slip-ring motor 4 supplied from alternating-current mains 5 through a reversing switchgear 6. Connected across the slip rings and brushes 4a is a liquid starting resistance device 7 of conventional form and actuated in the usual manner by a linkage 8 driven through a crank and gearing 9 by a driver's handle 10, resistance being cut out of circuit if the handle is moved to either side of its midposition. It will be understood that any other conventional form of variable resistance and master control means could be used for controlling the resistance in the rotor circuit of the motor.

The winding gear is provided with an electromagnetic brake which includes a field system 11 driven by the motor and a cooperating stationary secondary system 12 in which eddy currents can be induced by rotation of the field; this secondary system may be fluid cooled. The field system 11 is excited by a brake field winding 11b supplied with direct current through slip rings and brushes 11a by the armature 13 of a differentially excited control generator. Armature 13 is driven by a three-phase motor 14. The latter is energized from mains 5 through a switch 15 and operates at substantially constant speed. The motor 14 also drives the armature 16 of an exciter which provides a substantially constant voltage and is self-excited by a shunt field winding 16a having in series therewith a field regulating rheostat 17 whose adjustment need not be changed during the operation of the system. A rectifying valve 18 is included in series with the field winding 11b of the brake.

The arrangement so far described is common to Figs. 1 and 2. In Fig. 1, the field winding 13a of the differential generator 13 is supplied through rectifying means 19 from current transformers 20 disposed in the supply leads of the motor 4. A constant but adjustable opposing excitation is applied to generator 13 by a field winding 13b fed through a field regulator 21 from the constant-voltage exciter 16. The effect of valve 18 is such that the brake field 11 is excited only if the excitation applied by field winding 13a on the generator 13 is less than that applied by field winding 13b, that is, only if the primary current of motor 4 falls below a minimum value determined by the constant component of the excitation of the generator 13, and the brake has no effect if, as in accelerating, the motor current exceeds the set value. Accordingly, the excitation of the brake can, if necessary, cause additional load to be applied to the motor 4 which tends to slow down the motor and increase the primary current to the said predetermined minimum. The motor speed can then be determined by the value of the starting resistance 7 in the secondary circuit since for a given primary current the speed of motor 4 will have a particular value for a particular value of secondary resistance. The effect of the generator 13 may be enhanced by a self-excited shunt field winding 13c thereon in series with the field regulating resistance 22. When the motor 4 is at rest, the generator 13 may be fully excited by its field winding 13b and the brake field 11 accordingly fully excited. There may, however, be an economy resistance 23 normally shunted by contacts 24 in the circuit of field winding 13b of the generator, or a resistance 25 normally shunted by contacts 26 in circuit with the brake field winding 11b, or a resistance 27 normally shunted by contacts 28 in the circuit of shunt field winding 13c on the generator if such be provided. When a mechanical brake is applied, these contacts 28 are opened, but when the mechanical brake is taken off, these contacts are reclosed so that the electric brake is fully excited to keep the speed of the motor down to a low value if the load should drive the motor.

If, in the case of a hoist, the load should tend to drive the motor above synchronous speed, the motor then regenerating, there would be a progressive increase in the excitation provided by the field winding 13a with an increase in motor speed. Provision is accordingly made so that the necessary braking effort will be applied in order to keep the motor speed down to a safe value. For this purpose, the current transformers 20 and rectifying arrangement 19 supply field winding 13a of the generator through automatic reversing means here shown as a potentiometer 29 across which the supply is connected and movable brushes 29a and 29b across which the winding 13a is connected. Current transformers 30 are disposed in the secondary circuit of the motor 4 and feed, through a reversing switch 35, a small alternating-current torque motor 31. Motor 31 is schematically shown to have a sprocket 32 engaging a member 33 which is attached to springs 34 and 35 so as to oppose movement of the motor shaft in both directions. Springs 34 and 35 normally hold the arm of brushes 29a and 29b in vertical position in which the voltage applied to field winding 13a is zero. When hoist motor 4 is in motoring operation, torque motor 31 turns the brushes away from the vertical center position, for instance to the position shown, so that voltage is applied to winding 13a. In response to phase reversal in the secondary circuit, when the hoist motor 4 is regenerating, the torque motor 31 will reverse the relative positions of brushes 29a and 29b and thus reverse the polarity of the voltage applied to the field winding 13a and possibly decrease its effect whereby the resultant of the two components of excitation of the differential generator 13 is increased. The same result may be achieved alternatively by the use of a biased exciter driven by the hoist motor and supplying a further component of excitation to the generator only when the motor speed exceeds a predetermined value. The operation of switch 35 with switch 6 prevents the torque motor 31 from being reversed due to reversal of motor 4.

The main function of the above-described system is essentially to excite the brake so that an even load is kept on the shaft of the main motor for a varying load on the drum shaft, with a given setting of the speed rheostat. If a light load is on the drum the motor would naturally tend to speed up for a certain setting of the speed rheostat and thus draw a lighter current from the mains. This resulting decrease in motor current causes the energization of the winding 13a to decrease so that the net excitation applied to the brake, and thus the load on the motor shaft, is increased, tending to maintain substantially constant load on the motor.

Under these conditions, therefore, the brake is excited substantially proportional to the speed of the motor for a given setting of the speed rheostat.

A preferred alternative method of arranging the differential generator 13 is shown in Fig. 2. In this figure, one component of the excitation of generator 13 is determined by the position of a speed regulator 32 while the other component is provided by a tachometer generator and hence proportional to the motor speed. Thus, the field winding 13b of the differential generator 13 now receives a variable excitation and is fed by the exciter 16 through a rheostat 32 which serves as the speed regulator. This speed regulator is moved by the driver's handle 10 through linkage 8 so that it reduces the field resistance when resistance is cut out of the secondary circuit of motor 4. The other component of the excitation of the differential generator 13 is substantially proportional to the speed of the induction motor 4. To this end, the field winding 13a opposing the winding 13b is excited by a tachometer generator 33 which is driven by the hoist motor 4 and has its field winding 33a energized by the exciter 16. A bridge rectifier 34 in the circuit of the field winding 13a ensures that the current in this field is always in the same direction irrespective of the motor direction and eliminates the need of using a reversing contactor for this purpose.

The effect of rectifying valve 18 is that the brake field 11 is excited only if the excitation applied to the differential generator, by field winding 13a in accordance with motor speed, exceeds that applied by winding 13b under control by the speed regulator 32, that is, only if the motor speed exceeds a determined value. When the motor 4 has been accelerated and the speed regulator 32 is in the "full speed" position, the excitation produced by winding 13b may be such that the brake field 11 will not be excited unless the motor speed exceeds a predetermined abnormally high value, in particular, above synchronous speed. When the speed controller 32 is in the "off" position and the motor 4 is at rest, the differential generator 13 will be unexcited, but if the load should drive the motor 4—e. g. due to removal of a mechanical brake—the field winding 13a of generator 13 will be energized by the tachometer generator 33 and the brake will be fully excited at a comparatively low speed of the motor.

With the arrangement according to Fig. 2, a load can be lowered, if desired, without connecting motor 4 to the supply, the speed regulator 32 determining the speed solely by control of the brake 11.

In the modification of Fig. 2 shown in Fig. 3, the regulator 32 is in the circuit of field winding 13a but is now such that it increases the field resistance as resistance is cut out of the secondary circuit of motor 4. In the modification shown in Fig. 4, the regulator 32—acting in the same sense—is shown in the circuit of the field winding 33a of the tachometer generator 33.

While in a system as shown in Fig. 2, the strength of the brake field depends substantially on the actual speed of the motor, the modifications according to Figs. 3 and 4 have the effect that a certain percentage deviation of the motor speed from a given value will produce substantially the same percentage change in the brake irrespective of the actual motor speed.

In systems according to the invention, the differential control generator is preferably designed as an amplifying generator. It may be in accordance with British Patent No. 560,531 and preferably has one or more self-exciting amplifying field windings such as winding 13c.

In each case, the brake should be proportioned so that its torque-slip characteristic increases continuously from full speed to standstill, that is, from zero to 100% slip.

As compared with previously used arrangements for the direct-current dynamic braking of alternating-current induction-motor-driven mine winding gears, it will be noticed that backward movement of the handle 10, when the winding gear is running at full speed, can bring about any braking that may be necessary without the speed controller having to be first brought back to the off position and without the operation of switchgear for disconnecting the motor from the alternating-current supply and connecting to the source of direct-current for braking. In each case, the handle 10 operates the speed regulator. In Fig. 1, the variable resistance 7 is, itself, the speed regulating element proper that determines the speed of the motor 4. If, for any position of the regulator, the motor speed exceeds the corresponding value, the current taken by the motor 4 from the supply mains 5, and the current supplied by current transformers 20 to the field winding 13a, will be such that the generator 13 and hence also the brake field 11 will be excited in accordance with the excess speed. In Fig. 2, the variable resistance 32 is the speed regulating element; if, for any position of the regulator, the motor speed exceeds the corresponding value, the generator field winding 13a (supplied by tachometer generator 33 with current dependent on speed) will overcome the field winding 13b whereby the generator 13 and hence also the brake field 11 will be excited in accordance with the excess speed.

It will be apparent from the above-described embodiments and modifications that speed control systems according to our invention can be altered and modified with respect to various details, without departing from the principles of the invention and within the scope of its essential features set forth in the claims attached hereto.

We claim as our invention:

1. In combination, an alternating-current motor having a wound rotor, a control means for said motor comprising a resistance circuit connected to said rotor and adjustable means for controlling the resistance of said circuit, an electromagnetic brake for said motor having a brake winding, electric means connected to said field winding to supply energization therefor and having two opposingly acting control windings so that said energization is controlled in dependence upon the differential value of the excitation of said respective control windings, circuit means connected to one of said control windings for providing it with reference excitation, and circuit means connected to said other control winding and associated with said control means for exciting said other control winding substantially in accordance with the motor speed, whereby said brake winding is energized when said speed exceeds a value determined by said reference excitation.

2. In combination, an alternating-current motor having a wound rotor, a control means for said motor comprising a resistance circuit connected to said rotor and adjustable means for controlling the resistance of said circuit, an electromagnetic brake for said motor having a brake winding, a direct-current generator having an armature circuit connected to said brake winding to provide energization for said winding and two opposingly acting field windings for controlling said energization in dependence upon the differential excitation of said field windings, circuit means connected to one of said field windings for providing it with reference excitation, and circuit means connected to said other field winding and associated with said control means for exciting said other field winding substantially in accordance with the motor speed, whereby said brake winding is energized when said speed exceeds a value determined by said reference excitation.

3. In combination, an alternating-current motor having a wound rotor, control means for said motor including a resistance circuit connected to said rotor and adjustable means for controlling the resistance of said circuit, an eddy current brake for said motor having a brake winding, a direct-current generator having an armature circuit connected to said brake winding to provide energization for said winding and two opposingly acting field windings for controlling said energization in dependence upon the differential excitation of said field windings, circuit means connected to one of said field windings for providing it with reference excitation, circuit means connected to said other field winding and associated with said control means for exciting said other field winding substantially in accordance with the motor speed, and valve means disposed in said armature circuit to permit said brake winding to be energized only during decelerating periods of said motor.

4. In combination, an electric motor; a brake therefor comprising a primary brake system having a brake field winding, and a secondary brake system in which current is induced by relative movement between said systems; a speed regulator connected with said motor and being movable to different positions to determine different speeds of said motor; and circuit means connected to said brake field winding for providing energization for said winding, said circuit means being associated with said motor and said regulator to be controlled substantially in accordance with excess speed of said motor above the value corresponding to the position of said speed regulator.

5. In combination, an alternating-current induction motor having a primary circuit and a secondary circuit, a speed regulator having resistance means disposed in said secondary circuit for controlling said motor, a brake for said motor having two relatively movable magnetic structures of which one is mechanically connected to said motor, a brake field winding on one of said structures, circuit means connected to said winding to provide energization therefor and having two differential control means associated with said motor and said regulator respectively for controlling said energization in response to excessive motor speed over the speed value set by said regulator.

6. In combination, an electric drive having a drive motor and adjustable speed-control means for said motor, an eddy current brake mechanically connected with said motor and having a brake control winding, an exciter having an armature connected to said winding to provide energization therefor and having field means for controlling said energization, first circuit means connecting said field means to said motor for providing a component control of said energization substantially in accordance with the motor speed, and second circuit means connected to said field means and controlled by said speed-control means for providing another component control of said energization dependent upon the adjustment of said speed-control means, said first and second circuit means being differentially related to each other for controlling said brake in response to excessive motor speed over the speed value set by said speed-control means.

7. In combination, an electric drive having a drive motor and adjustable speed-control means for said motor, an eddy current brake mechanically connected with said motor and having a brake control winding, an exciter having an armature connected to said winding to provide energization therefor and having field means for controlling said energization, first circuit means and second circuit means connected to said field means for differentially controlling said energization, said first circuit means being connected to said motor to be controlled in dependence upon the motor speed, said second circuit means being connected to said speed-control means to be controlled in dependence upon the adjustment of said speed-control means, and electric valve means interposed between said armature and said brake winding to render said energization effective only when the motor speed exceeds the speed value set by said speed-control means.

8. In combination, an electric drive having a drive motor and adjustable speed-control means for said motor, an eddy current brake mechanically connected with said motor and having a brake control winding, an exciter having an armature connected to said winding to provide energization therefor and having field means for controlling said energization, first circuit means and second circuit means connected to said field means for differentially controlling said energization, said first circuit means being connected to said motor to be controlled in dependence upon the motor speed, said second circuit means being connected to said speed-control means to be controlled in dependence upon the adjustment of said speed-control means, and voltage supply means connected to said field means for applying thereto a bias in opposition to said differential energization in order to render said energization effective only when the motor speed exceeds the value set by said speed control means by an amount determined by said bias.

9. In combination, an electric motor, adjustable speed-control means for said motor, an electro-magnetic brake mechanically connected with said motor and having a brake control winding, an exciter having an armature connected to said winding to provide variable energization therefor and having two mutually differential field windings for jointly controlling said windings for jointly controlling said energization, control means connected with said motor for providing a voltage in accordance with the motor speed and connected to one of said field windings, circuit means connected to said other field winding and controlled by said speed-control means to provide said other field winding with voltage dependent upon the adjustment of said speed-control means, and constant-voltage supply means connected to one of said field windings for applying a voltage bias thereto, whereby said brake is controlled in response to excessive motor speed.

10. In combination, an electric motor, adjustable speed-control means for said motor, an electro-magnetic brake mechanically connected with said motor and having a brake control winding, an exciter having an armature connected to said winding to provide variable energization therefor and having two mutually differential field windings for jointly controlling said energization, a tachometer generator mechanically connected to said motor and electrically connected to one of said field windings to apply to the latter a voltage depending upon the motor speed, voltage supply means of normally constant voltage connected to said other field winding, and a variable resistor connected with one of said field windings to vary the energization of the latter, said resistor being connected to said speed control means so as to be controlled in dependence upon the adjustment of said speed control means.

HERBERT STIRLING CARNEGIE.
HARRY DOLAN.

REFERENCES CITED

The following references are of record in the file of this patent:

UNITED STATES PATENTS

| Number | Name | Date |
|---|---|---|
| 2,246,295 | Cook | June 17, 1941 |